United States Patent [19]

Wilcox et al.

[11] 4,324,568
[45] Apr. 13, 1982

[54] METHOD AND APPARATUS FOR THE LEAK TESTING OF FILTERS

[75] Inventors: David E. Wilcox, Carpinteria; Thomas T. Allan, San Francisco, both of Calif.

[73] Assignee: Flanders Filters, Inc., Washington, N.C.

[21] Appl. No.: 177,234

[22] Filed: Aug. 11, 1980

[51] Int. Cl.³ .................. B01D 46/12; G01M 3/20
[52] U.S. Cl. .................................... 55/97; 55/270; 239/514; 73/40.7
[58] Field of Search ............ 55/97, 270, 262, 418; 239/456, 457, 514; 73/38, 407, 432 PS

[56] References Cited

U.S. PATENT DOCUMENTS

| | | | |
|---|---|---|---|
| 604,426 | 5/1898 | Seifert | 55/418 |
| 1,952,989 | 3/1934 | Joseph | 55/418 |
| 2,297,082 | 9/1942 | Staats | 239/456 |
| 2,699,287 | 1/1955 | Daninhirsch | 239/514 |
| 3,185,181 | 5/1965 | Demyan | 239/514 |
| 3,323,437 | 6/1967 | Knab | 55/270 |
| 3,385,036 | 5/1968 | Webb | 55/418 |
| 3,395,514 | 8/1968 | Bub | 55/97 |
| 3,519,024 | 7/1970 | Johnson et al. | 239/514 |
| 3,522,724 | 8/1970 | Knab | 55/437 |
| 3,749,130 | 7/1973 | Howitt et al. | 55/418 |
| 3,782,884 | 1/1974 | Shumaker | 239/456 |
| 3,865,561 | 2/1975 | Osborn | 73/38 |
| 3,865,561 | 2/1975 | Osborn | 73/38 |
| 3,949,594 | 5/1976 | Treaftis et al. | 55/270 |
| 4,034,659 | 7/1977 | Raider | 55/270 |
| 4,055,075 | 10/1977 | Allan et al. | 73/40.7 |

FOREIGN PATENT DOCUMENTS 1427940  3/1976  United Kingdom ................ 239/514

OTHER PUBLICATIONS

Burchsted et al., Nuclear Air Cleaning Handbook, printed by Oak Ridge National Lab., pp. 187-208, 1976.

Primary Examiner—Gregory N. Clements
Attorney, Agent, or Firm—Bell, Seltzer, Park & Gibson

[57] ABSTRACT

A method and apparatus for the leak testing of one or more filters, which requires minimum space, and which comprises a housing adapted to sealably mount the filters, means for introducing DOP particles within the housing and immediately upstream of each of the filters, and a funnel-shaped member mounted in the housing upstream of each filter and downstream of the point at which the DOP is introduced. The member may be selectively positioned to assume an operative position transverse to the airstream wherein it acts to condense and mix the airstream and DOP and then disperse the mixture over the full frontal area of the adjacent filter, or a non-operative position wherein the member is substantially withdrawn from the airstream. Means are also mounted downstream of each filter for monitoring the airstream to detect DOP particles, and thereby permit a determination as to whether any of the particles are leaking through or around the filter.

12 Claims, 8 Drawing Figures

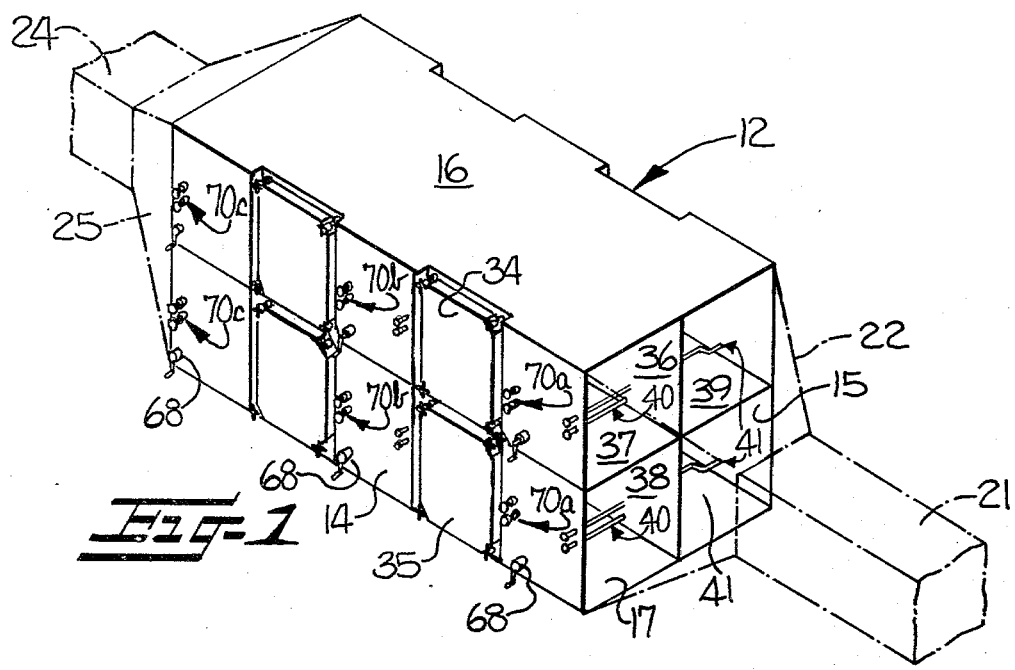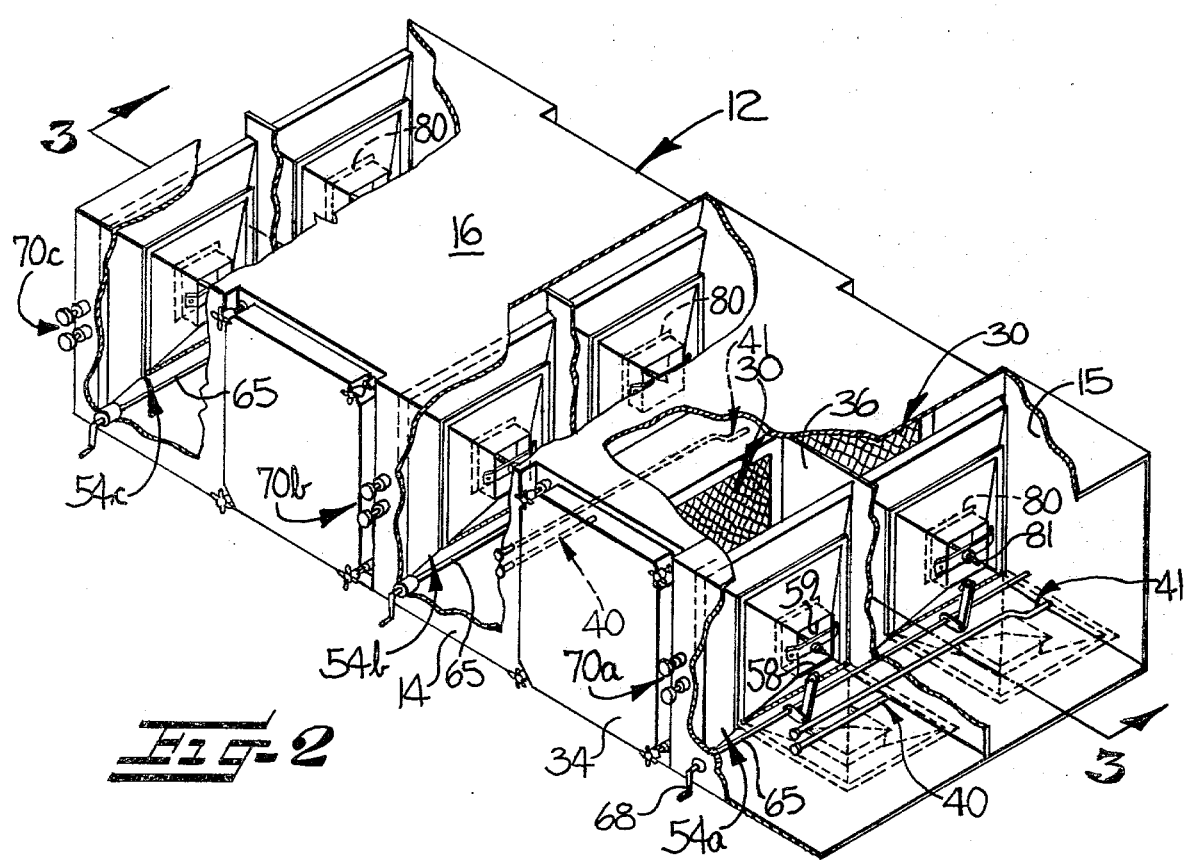

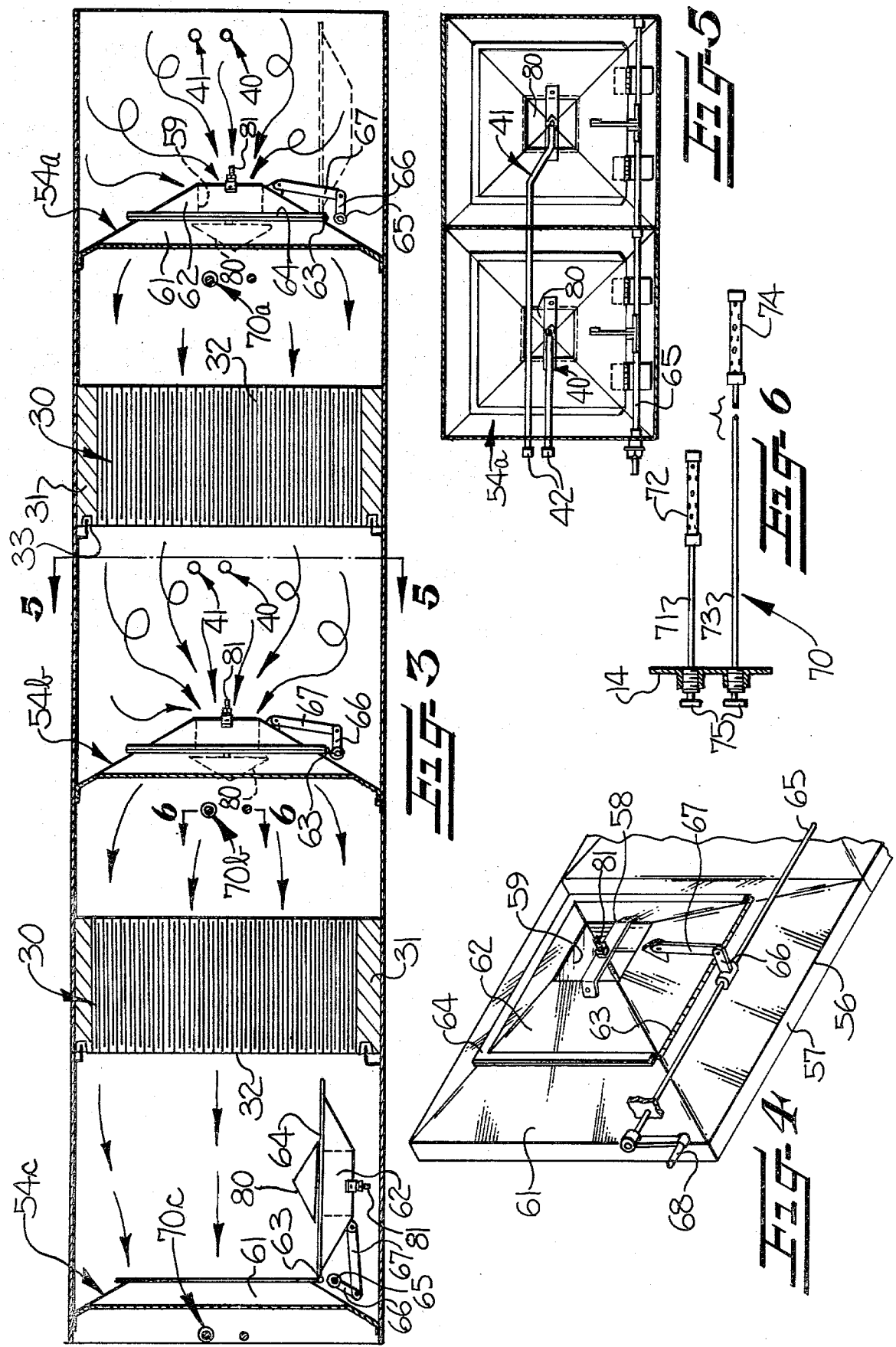

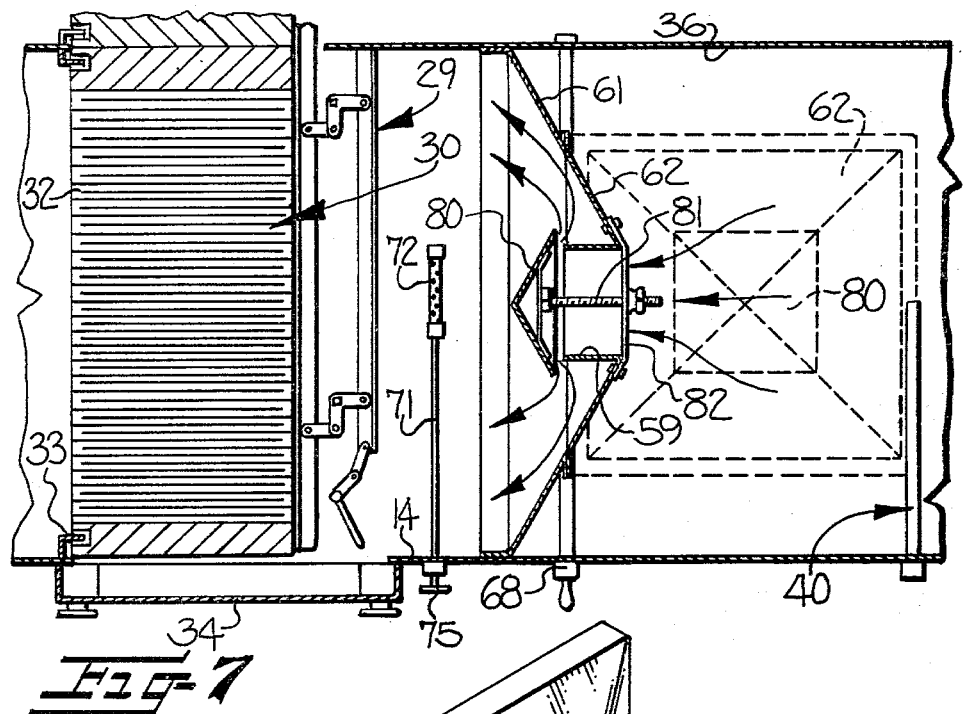
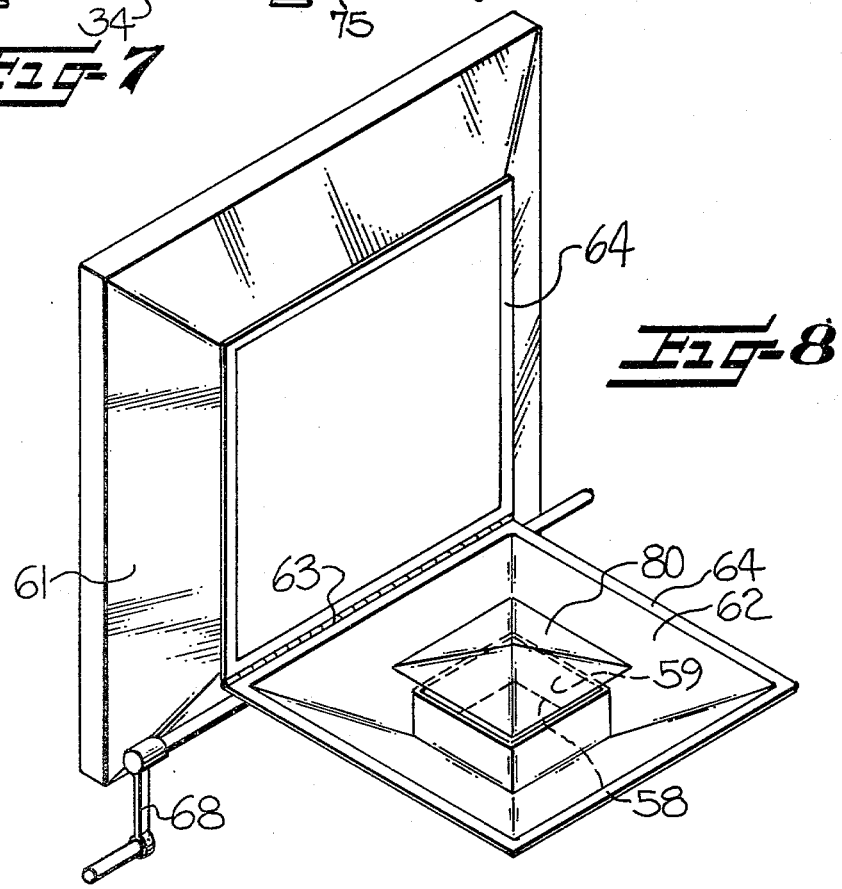

METHOD AND APPARATUS FOR THE LEAK TESTING OF FILTERS

This is a continuation of application Ser. No. 017,289 filed Mar. 5, 1979, now abandoned.

The present invention relates to a housing for mounting one or more banks of high efficiency air filters in an air duct system, and which requires minimum space, permits the leak testing of the filters from outside the housing, and which permits the identification of a leaking filter in the bank.

In the manufacture of high efficiency air filtration systems, the filters, housings, and related components are usually initially tested as the final manufacturing step at the factory to locate any leaks and insure compliance with the desired efficiency rating. In addition, it is recognized that in-place testing of the completed installation is essential to insure leak tightness of the housing and filters in their assembled form. Also, in-place tests are usually conducted after each change of a filter in the system to insure proper installation of the new filter, as well as at regular intervals after installation to detect any deterioration of the gaskets or clamping devices, or the development of weld cracks or the like in the housing which result in leaks. Such periodic in-place testing is particularly important where harmful materials, such as potentially radioactive substances, dangerous viable organisms, or carcinogenic or toxic materials, are removed from the airstream by the filtration system.

Both factory and in-place efficiency testing of filters and filter installations conventionally utilizes either a monodispersed or a polydispersed aerosol of dioctyl phthalate (DOP) droplets or particles which have a light-scattering mean diameter of 0.3 to 0.7 microns, respectively. The DOP is introduced into the airstream at a point in the duct far enough upstream of the filter or filter bank to assure complete dispersion by the time it reaches the filter or bank of filters. An upstream sampling device is usually provided immediately upstream of the filter to determine the concentration of the DOP in the duct, and a downstream sampling device is provided to detect leakage. A portion of the airstream is withdrawn from the duct through the sampling devices and conveyed to an external photometric light-scattering instrument or the like which is designed to determine the DOP concentration in both the upstream and downstream samples.

In order to insure that the air-DOP mixture charged to the filters is thoroughly mixed to obtain a substantially uniform dispersion, and that the upstream sample is representative of the DOP concentration at that point, it has been recommended that the DOP be introduced at least ten duct diameters upstream of the filters, or introduced upstream of baffles or turning vanes in the duct. Also, the use of a Stairmand disk positioned three to five duct diameters upstream of the filters has been recommended for this purpose, see for example Chapter 7 of "Design, Construction, and Testing of High Efficiency Air Filtration Systems for Nuclear Applications" By Burchsted and Fuller, published January 1970 by Oak Ridge National Laboratory. Thus in order to properly introduce the DOP into the airstream utilizing these recommended procedures, extra equipment and a great deal of space is required.

It is also presently recommended that the downstream sampling port be located a considerable distance downstream of the filter, and preferably downstream of the exhaust fan, to insure that any DOP which leaks through the filter becomes sufficiently mixed with the filtered air so that the leak will be detected no matter where in the airstream the sample is withdrawn. This procedure not only serves to further increase the space requirements of the test apparatus, but also, it reduces the assurance that a leak will be detected by reason of the dilution effect of the leaking DOP in the great volume of filtered air. As will be apparent, this dilution effect is particularly pronounced where a large bank of filters is employed.

In installations requiring multiple banks of filters employed in series, the space requirements for introducing the DOP, and withdrawing the samples, are multiplied since the banks must be separated a distance sufficient to accomplish the above objectives. In an attempt to alleviate this problem, it has been proposed to employ temporary ducts between the various banks with suitable valves therein, and with the temporary ducts serving to selectively isolate each bank in the apparatus during the test procedure and introduce the DOP and withdraw the samples at an appropriate distance from each bank. However, this proposed system is not entirely satisfactory since it requires a great deal of extra equipment which is only used during the test procedure, and the use of temporary ducts adds additional problems of possible leakage through the various required connections and valves.

Where the above tests indicate the presence of an unacceptable leak, it is standard practice for a workman to physically enter the duct at the downstream side of the filter bank to conduct leak probing of individual filters, and thereby permit identification and replacement of the faulty filter. In some cases, it is also necessary for the workman to enter the upstream side to locate the source of the leakage problem. Such direct personnel access is often impractical and/or dangerous however, either because of the system configuration, or because of high radioactivity levels or the presence of other dangerous materials in the airstream. In such cases, it has been previously proposed that the housing incorporate remotely operated longhandles probes which are able to cover the entire downstream area of the filter bank, or alternatively, that the workman don protective clothing prior to entering the duct. As will be apparent, neither of these alternatives is satisfactory, since the design and fabrication of suitable remotely operated probes significantly adds to the cost of the housing, and the physical entry of a workman into the duct greatly increases the risk of contamination to himself as well as other workers.

Still another problem associated with the above described conventional testing procedure for a bank of filters is the fact that a great deal of DOP must be fed into the airstream to assure an adequate dispersion in front of each filter. Since the area of the bank may be quite extensive, it is often difficult to achieve an even distribution of the DOP over the face of the entire bank, even when the DOP is introduced ten duct diameters upstream as recommended, and in addition, it is difficult to generate a sufficient quantity of the DOP for such large banks. Also, the DOP tends to become deposited on all of the filters while each individual filter in the system is being probed, thereby unduly loading the filters and increasing their resistance to the passage of the air.

Applicants' prior U.S. Pat. No. 4,055,075 discloses a method and apparatus for the leak testing of filters wherein the above noted disadvantages of the earlier techniques and equipment are effectively overcome. More particularly, the applicants' prior patent discloses a test housing wherein the DOP is introduced and dispersed into the duct at a location closely adjacent the upstream face of the filter to thereby minimize floor space, and wherein each filter is charged with DOP and tested individually to permit the ready identification of a leaking filter without manually entering the duct and probing the filters. Further, in one embodiment of the patented housing, there is provision for selectively condensing and imparting turbulence to the airstream immediately downstream of the filter so that the sample may be withdrawn at a location immediately downstream of the filter to thereby further reduce the space requirements.

The present invention relates to an improvement of the method and apparatus as disclosed in the above prior patent. More particularly, it has been found that the transition, plenum connections, flanges, and other duct components located upstream of the housing, can unless carefully designed, result in non-uniform flow among the several filters in the bank, as well as non-uniform flow to various portions of a single filter. This non-uniform flow in turn renders it difficult to uniformly disperse the DOP to the filters during the test procedure.

It is accordingly an object of the present invention to provide a method and apparatus for the leak testing of filters, and which includes a structurally simple, yet highly efficient means for effectively dispersing an air-DOP mixture immediately upstream of each filter.

It is another object of the present invention to provide a method and apparatus for substantially uniformly balancing the air flow among the several filters in a filter bank, to thereby facilitate the uniform dispersion of DOP to each of the filters during a leak testing procedure.

It is still another object of the present invention to provide a method and apparatus for the leak testing of filters in series, and wherein there is provided a single structure which is able to selectively function to mix and condense the air passing through an upstream filter to thereby permit a representative sample to be readily withdrawn and analyzed during testing of the upstream filter, or to mix and disperse the particles in the airstream during the testing of a downstream filter.

It is also an object of the present invention to provide a structure of the described type which may be selectively moved into an operative position transverse to the airstream during a test procedure, and then moved to a withdrawn position so as to provide little interference with the normal air flow through the housing.

These and other objects and advantages of the present invention are achieved in the embodiments illustrated herein by the provision of an apparatus which comprises a housing defining an air pasageway therethrough, means for sealably mounting a filter within the housing, means for introducing particles of predetermined size into the airstream, and means mounted at a point upstream of the filter and downstream of the point at which the particles are introduced for selectively partially restricting the airstream and imparing turbulence thereto, and then dispersing the airstream over the full frontal area of the filter. Preferably, the restriction means comprises a funnel-shaped member mounted within the housing and having a base with a peripheral outline closely corresponding in size and configuration to the outline of the air passageway and an apex having an opening therethrough. The funnel-shaped member is movable between an operative position wherein the member is disposed transversely across the housing and the airstream is thereby condensed and passes through the opening in the funnel-shaped member, and a nonoperative position wherein at least a substantial portion of the member is disposed along the side of the housing and is substantially withdrawn from interference with the airstream. Means are also provided for detecting at least a portion of any particles in the airstream at a location downstream of the filter to thereby permit a determination as to whether any of the particles are leaking through or around the filter.

In the preferred embodiment, the housing is rectangular in cross-section, and the funnel-shaped member is in the form of a truncated four sided pyramid, and further comprises a tube affixed about the periphery of the opening and extending in a direction toward and perpendicular to the base of the pyramid. Also, the base of the pyramid is preferably disposed downstream of the apex thereof, so that the member acts to condense the airstream while imparting turbulence thereto, and the airstream exiting from the tube expands so that the airstream and particles are substantially uniformly dispersed over the full frontal area of the adjacent, downstream filter.

Where the housing mounts a bank of filters in parallel, the invention further contemplates the positioning of panels upstream of the filters to divide the housing into separate channels for the filters, and a funnel-shaped member as described above is mounted immediately upstream of each filter within each of the channels. The filters may then be individually tested by initially moving each of the funnel-shaped members to their transverse operative position, sequentially introducing DOP into each air channel upstream of the filter, and monitoring the airstream downstream of the filter bank to detect for the presence of leaking DOP. By this procedure, the funnel-shaped members function to partially restrict the flow through each of the channels, resulting in a substantially balanced flow among the isolated portions. This in turn facilitates the uniform dispersion of the DOP within each channel.

Where the housing mounts a number of filters in series, a funnel-shaped member as described above may be mounted intermediate the filters, where it functions to mix and condense the air passing through the upstream filter during testing thereof to permit a representative sample to be readily withdrawn and analyzed, and to mix and disperse the particles in the airstream during the testing of the downstream filter.

Some of the objects having been stated, other objects will appear as the description proceeds, when taken in conjunction with the accompanying drawings in which FIG. 1 is a perspective view of a filter test housing which embodies the features of the present invention;

FIG. 2 is a perspective view, partly broken away, of the upper half of the filter housing shown in FIG. 1;

FIG. 3 is a sectional elevation view taken substantially along the line 3—3 of FIG. 2, but with the final funnel-shaped member being shown in its non-operative position;

FIG. 4 is a fragmentary perspective view illustrating the apparatus for restricting and distributing an airstream in accordance with the present invention;

FIG. 5 is a front elevation view, on a reduced scale, of the upstream side of the apparatus shown in FIG. 2;

FIG. 6 is a fragmentary elevation view, illustrating the DOP sampling device and taken substantially along the line 6—6 of FIG. 3;

FIG. 7 is a sectional plan view of the upstream portion of the apparatus shown in FIG. 3, but illustrating only one of the air channels; and FIG. 8 is a perspective view of the funnel-shaped member of the present invention, and illustrated in its non-operative position in the housing.

Referring more specifically to the drawings, one embodiment of the present invention is illustrated which includes a housing 12 which is adapted to form a part of an air duct system, such as an exhaust air cleaning system in a nuclear fuel manufacturing facility. More particularly, the housing 12 comprises a generally box-like enclosed structure having two side walls 14 and 15, a top wall 16, and a bottom wall 17. Also, the housing defines a forward open end which is joined to an air inlet opening of the inlet duct 21 via the transition member 22, and a rear open end which is similarly joined to the outlet duct 24 via the transition member 25. The housing is typically fabricated from a sheet metal material, such as 14 gauge stainless steel.

In the illustrated embodiment, the housing 12 mounts two banks of filters in series, with each bank comprising four filters 30 in parallel. Typically, each filter 30 is about 24×24×12 inches in size, and comprises a wooden or chipboard frame 31 surrounding and supporting a pleated filtering media 32, such as a nonwoven fiberglass or cellulose-asbestos sheet material. Filters of this type may have extremely high dust retention characteristics, usually greater than about 95% efficiency, and typically 99.97% efficiency, as measured by the conventional DOP test, and are known as "absolute" or HEPA filters in the art.

The filters 30 of each bank are adapted to be inserted and removed from the housing 12 through the two associated side access doors 34, 35 with the two upper filters in each bank being inserted and removed through the upper door 34, and the two lower filters being inserted and removed through the lower door 35. As is well known in the art, clamping means as shown somewhat schematically in FIG. 7 at 29, and sealing means are provided in the housing 12 for sealably mounting each of the filters therein. This sealing means may include a resilient gasket on the front peripheral face of the filter frame 31, or a fluid type seal such as shown schematically at 33 and as described in the U.S. Pat. No. Re. 27,701 to Allan. Where a dangerous substance, such as radioactive material or viable organisms may be present on the filters or in the airstream, the housing may further include a conventional "bag-out" ring (not shown) about each of the access doors 34, 35 to permit the filters 30 to be enclosed in a plastic bag while being removed from the housing and thereby avoid possible contamination.

The portion of the housing 12 immediately upstream of each bank of filters is divided into four separate and rectangular air channels by means of the four perpendicularly disposed panels 36, 37, 38 and 39. Each channel is aligned with one of the filters, and generally conforms in cross-sectional outline and size to that of the associated filters. Thus for example, the panels 36 and 37 cooperate with the side wall 14 and top wall 16 to define a separate air channel upstream of the filter located in the upper left hand corner of the bank as seen in FIG. 1. By this arrangement, the airstream entering the housing from the transition member 22 is divided by the panels into four equal portions, with each portion being isolated from the other portions and directed to pass through a single filter. Where the housing mounts a number of banks of filters in series, the panels 36–39 may extend the entire distance between the banks as best seen in FIG. 2 so as to similarly define air channels for the downstream filters. In this regard, it will be understood that the panels 36 and 38 are discontinuous at points immediately adjacent the filters to accommodate the sliding receipt of the inner filter, as well as the clamping mechanism 29, note FIG. 7.

In accordance with the present invention, means are provided for selectively introducing particles of predetermined size (typically DOP particles having a mean diameter of between about 0.3 to 0.7 microns) in the portion of the airstream passing through each one of the channels. As illustrated, this particle introducing means comprises two pairs of supply pipes 40 and 41 which extend horizontally through the housing upstream of the first bank of filters. One pair of supply pipes is operatively associated with the two upper filters in each bank, and another pair is operatively associated with the two lower filters. As best seen in FIG. 5, the pipe 40 terminates at a point centrally disposed in the adjacent air channel, and the pipe 41 extends in a central location in the far air channel. Both pipes include an exteriorly positioned cap 42, to permit the pipes to be selectively coupled to a DOP supply source.

The apparatus of the present invention also includes means mounted within each of the separate channels for selectively mixing the airstream and DOP particles, and then substantially uniformly dispersing the same over the full frontal area of the adjacent filter. In the illustrated embodiment, this mixing and dispersing means comprises restriction means in the form of a funnel-shaped member 54 mounted upstream of the filter and downstream of the associated DOP supply pipe. The funnel-shaped member 54 comprises a truncated, four sided pyramid which includes a base 56 which has a rectangular peripheral outline corresponding in size and configuration to the cross-sectional outline of the interior of the channel, and which defines a plane disposed transversely across the channel. A flange 57 is affixed to the base 56 to facilitate the mounting of the member in a rectangular duct. The member 54 also has an apex having a rectangular opening 58 therethrough, and a tube 59 having a rectangular cross-sectional outline corresponding to that of the opening 58. The tube is affixed to the periphery of the opening 58 and extends a substantial distance into the interior of the member and in a direction parallel to the direction of air flow, i.e., toward and perpendicular to the plane defined by the base 56. Preferably, the tube extends at least about one-half the distance to the plane of the base 56.

A transverse deflector 80 overlies in spaced relation the free end of the tube 59, and as best seen in FIG. 7, the deflector acts to laterally deflect the airstream moving through the tube, and thereby achieve a substantially uniform dispersion to the downstream filter. In the illustrated embodiment, the deflector 80 comprises a four sided pyramid which is disposed with its base overlying the downstream end of the tube 59. The deflector is attached to the tube by any suitable means, and as illustrated, the attachment means comprises a longitudinally directed threaded member 81 fixed to the inside of the deflector, and a cooperating transverse strap 82 mounted across the opening of the apex of the member 54. By this arrangement, longitudinal adjustment of the deflector with respect to the tube is permitted so that the spacing therebetween can be readily adjusted to best achieve the desired uniform dispersion.

The funnel-shaped member 54 also is composed of two separate components, namely, the lower base portion 61 which is adjacent the base 56, and a separate apex portion 62 adjacent the apex and including the tube 59 and deflector 80. The base portion 61 of the member 54 is fixedly mounted in the channel of the housing by welding or the like, and it may be described as being truncated to define a relatively large rectangular opening (not numbered) disposed centrally in the housing. The apex portion 62 is hingedly mounted to the base portion by a hinge 63 which extends transversely across the housing and adjacent the opening of the base portion. In addition, the two portions 61, 62 include mating flanges 64 to facilitate the interface thereof.

To more particularly describe the size and configuration of an exemplary embodiment of the member 54, the base 56 and opening 58 are each square in cross-section, with the base being about 24 inches along each side and the opening 58 being about 6 inches along each side. The flange 57 is about 1 inch wide, the longitudinal distance from the base 56 to the apex is about $5\frac{1}{4}$ inches, and the tube 59 has a longitudinal length of about 3 inches.

The apex portion 62 may be pivoted between an operative position wherein the member is in the form of a truncated pyramid which is disposed transversely across the air passageway, and a non-operative position (note the position of the member 54c in FIG. 3) wherein the apex portion 62 is disposed along the side of the air passageway so as to be substantially withdrawn from interference with the airstream. The means for operatively controlling the positioning of the apex portion 62 of the member 54 comprises a control rod 65 which extends through the wall 14 of the housing and in a direction parallel to the hinged interconnection 63. A linkage 66, 67 interconnects the rod 65 and apex portion 62 (note FIG. 4), and a crank 68 is positioned on the outside of the housing for rotating the rod to pivot the apex portion 62 between its operative and non-operative positions. In this regard, it will be noted that the rod 65 extends through the two laterally adjacent channels, such that the two members 54 are concurrently operated by rotation of the rod.

Viewing FIG. 3, it will be seen that the housing includes a first funnel-shaped member 54a positioned upstream of the first filter, a second like funnel-shaped member 54b mounted immediately downstream of the first filter and upstream of the second filter, and a third like funnel-shaped member 54c which is mounted immediately downstream of the second filter.

The housing 12 also includes means for withdrawing a sample of the airstream at each of three separate locations along its length. A first sampling means 70a is provided immediately downstream of the first funnel-shaped member 54a, a second sampling means 70b immediately downstream of the second member 54b, and a third sampling means 70c immediately downstream of the third member 54c. Each of these three sampling means comprises a first pipe 71 extending laterally into the first adjacent channel and having an apertured sampler 72 positioned immediately downstream of and in alignment with the tube 59 of the adjacent funnel-shaped member, and a second pipe 73 extending into the laterally remote channel and including a similarly positioned sampler 74, note FIG. 6. Each pipe extends through the wall 14 of the housing, and includes a removable end cap 75 for permitting the sampler to be selectively connected to a conventional DOP detecting apparatus.

During normal operation of the filter housing 12, the apex portions 62 of all of the funnel-shaped members 54 are lowered into their non-operative position, so as to minimize air resistance. When leakage tests are to be conducted on the upstream bank, the apex portions 62 of the four members 54a which are upstream of the initial bank of filters, as well as the four members 54b immediately downstream of this bank, are all raised into their operative positions. The third members 54c preferably remain open, such that the various members are oriented in the manner shown in FIG. 3.

The above disposition of the members results in the air flow being partially restricted as it moves through each of the four channels, and this restriction produces a back pressure upstream of the housing, which in turn serves to substantially balance the flow among the four channels. Thus an uneven flow pattern resulting from the design of the transition 22, plenum connections, or other upstream duct components, is avoided.

The DOP particles are then selectively and independently introduced into each of the four channels by means of their associated pipes 40 and 41. In each instance, the airstream and entrained particles approach the first member 54a, and substantial turbulence is imparted thereto to mix the particles and air as illustrated schematically in the right hand portion of FIG. 3, and the airstream is condensed into the tube 59 of the member. As the airstream exits the tube 59 and deflector 80, it is dispersed over the full cross-sectional area of the channel. At relatively low flow rates, such as where testing is conducted for example at 20% of the designed flow rate of the housing, substantially uniform dispersion over the full frontal area of the filter is achieved. The first sampling means 70a may at this point in the test be connected to the DOP detecting apparatus to determine the upstream concentration of the DOP.

The airstream continues through the first filter and strikes the downstream second member 54b, which again imparts turbulence to the airstream and condenses it to pass through the tube 59 of the member. Thus the air and any leaking DOP is thoroughly mixed by the time it passes through the tube 59, and such that the sampler 72 (or 74), which is positioned immediately downstream of the tube 59 will be assured of picking up a representative portion of any leaking DOP when it is connected to the detecting apparatus. By this testing procedure, each filter in the first bank may be individually tested, so that the identification of a leaking filter is readily apparent.

To test the filters of the second bank, the four members 54a are preferably moved to their non-operative lowered position, and the two downstream sets of members 54b and 54c are each moved to their operative positions. DOP is then selectively introduced from the associated pipes 40, 41 into each of the four channels, and samples are withdrawn through the samplers of the third sampling means 70c to detect any leaking DOP in the manner described above. In this instance, it will be noted that the members 54b now serve the dual functions of balancing the flow to the second bank of filters, and mixing the air and DOP particles and dispersing the mixture to the second filters. Thus a single component in the housing, namely the members 54b, perform distinctly different functions during the testing of the two filter banks.

In the drawings and specification, there has been set forth a preferred embodiment of the invention, and although specific terms are employed, they are used in a generic and descriptive sense only and not for purposes of limitation.

That which is claimed is:

1. A method for testing for leakage of particles of predetermined size through a bank of filters installed in a parallel arrangement in a housing and which is characterized by the ability to individually test the filters in the bank under balanced flow conditions and so as to permit the immediate identification of a leaking filter in the bank, and comprising the steps of passing an airstream concurrently through all of the filters in the bank, while dividing the airstream into isolated portions immediately upstream of each filter such that each isolated portion of the airstream passes through a single filter, partially restricting and imparting turbulence to the flow concurrently through all of the isolated portions and at a point upstream of each filter, and so as to obtain turbulence throughout substantially the full cross sectional area of each isolated portion and a substantially balanced flow among the isolated portions, and including pivoting a restriction member mounted within each of said separate channels from a non-operative position disposed in general alignment with the sides of the channel to an operative position disposed transversely across the channel, then sequentially introducing particles of predetermined size within each isolated portion of the airstream and upstream of the point at which the flow is partially restricted and made turbulent, to thereby result in the particles being mixed in the air, and while maintaining a substantially unrestricted flow between the point of particle introduction and the point at which the flow is partially restricted and made turbulent, and monitoring the airstream downstream of the bank of filters to detect at least a portion of any particles in the airstream, such that a determination may be made as to which if any of the filters in the bank is leaking.

2. The method as defined in claim 1 wherein the step of partially restricting the flow further includes condensing the flow into a central location with respect to each of the associated filters.

3. The method as defined in claim 2 comprising the further step of substantially uniformly dispersing the flow through each isolated portion and immediately downstream of the point at which it is partially restricted and made turbulent, and so that the mixed air and particles are substantially uniformly dispersed over the frontal area of the associated filter.

4. The method as defined in claim 1 wherein the step of monitoring the airstream comprises partially restricting all of the isolated portions of the airstream immediately downstream of the associated filters, and while imparting turbulence thereto.

5. The method as defined in claim 4 wherein the step of monitoring the airstream further comprises withdrawing samples of each of the isolated portions of the airstream after it has been partially restricted and made turbulent downstream of the filters, and in a sequence corresponding to the sequence for introducing particles into the isolated portions.

6. An apparatus for filtering an airstream and having provisions for testing for leakage of particles of predetermined size through or around each of at least two filters mounted in series, and characterized by minimum space requirements, and comprising a housing defining an air passageway adapted to form a part of an air duct system having an airstream passing therethrough, means for sealably mounting first and second filters within the housing in a spaced apart, serial arrangement and such that the airstream passing through the housing passes serially through the first and then the second filter, means for selectively introducing particles of predetermined size into the airstream within the housing and immediately upstream of each filter, first restriction means mounted upstream of the first filter and downstream of the associated particle introducing means for partially restricting the airstream and imparting turbulence thereto, and then dispersing the airstream over the full frontal area of the first filter, second restriction means mounted upstream of the second filter and downstream of the associated particle introducing means for partially restricting the airstream and imparting turbulence thereto, and then dispersing the airstream over the full frontal area of the second filter, means mounted upstream of the second filter and downstream of said second restriction means for detecting at least a portion of any particles in the airstream to thereby permit a determination as to whether any of the particles are leaking through or around the first filter, and means mounted downstream of the second filter for detecting at least a portion of any particles in the airstream to thereby permit a determination as to whether any of the particles are leaking through or around the second filter, whereby the second restriction means is adapted to mix the airstream and leaking particles during testing of the first filter, and to mix the airstream and the particles introduced immediately upstream of the second filter during testing of the second filter.

7. The apparatus as defined in claim 6 wherein each of said first and second restriction means includes a restriction member pivotally mounted within said housing for movement between a non-operative position disposed in general alignment with the sides of the housing and an operative position disposed transversely across the housing.

8. The apparatus as defined in claim 7 wherein said particle detecting means mounted downstream of the second filter comprises a third restriction member pivotally mounted within said housing for movement between a non-operative position disposed in general alignment with the sides of the housing and an operative position disposed transversely across the housing, and means positioned immediately downstream of said third restriction member for withdrawing a sample of the airstream to permit an analysis of the same.

9. The apparatus as defined in claim 8 wherein each of said means for introducing particles into the airstream comprises a tubular member extending transversely across said housing, said tubular member having an opening therein which is disposed within said housing, and means operable from outside the housing for selectively introducing particles into said housing through said opening.

10. The apparatus as defined in claim 8 or 9 wherein said particle detecting means mounted upstream of the second filter comprises means positioned immediately downstream of said second restriction member for withdrawing a sample of the airstream to permit an analysis of the same.

11. An apparatus for filtering an airstream through a bank of filters and having provision for testing for leakage of particles of predetermined size through or around any of the filters and characterized by substantially balanced flow among the filters and by the ability to permit the immediate identification of a leaking filter in the bank, and comprising a housing adapted to form a part of an air duct system having an airstream passing therethrough, means for sealably mounting a bank of filters in parallel arrangement in said housing such that the airstream passing through the housing passes through the bank of filters, panel means mounted within said housing and immediately upstream of the bank of filters for dividing the housing into a separate air channel for each of the filters, and such that the airstream is divided into an isolated portion within each of the separate channels which passes through a single filter, means mounted within each of said separate channels for selectively introducing particles of predetermined size into the portion of the airstream passing therethrough, means mounted within each of said separate channels and upstream of the filter and downstream of the particle introducing means for selectively partially restricting and imparting turbulence to the flow concurrently through all of the isolated portions, and so as to obtain turbulence throughout substantially the full cross sectional area of each isolated portion and thereby mix the airstream and particles, and also achieve a substantially balanced flow among the isolated portions, said restricting means including a restriction member pivotally mounted within each channel for movement between a nonoperative position wherein at least a substantial portion of the member is disposed parallel to the sides of the channel, and an operative position disposed transversely across the channel, said air channel for each of said filters being free of any substantial restriction to flow between the particle introducing means and said restriction member, and means mounted within said housing and downstream of said filter bank for detecting at least a portion of any particles in the airstream to thereby permit a determination as to whether any of the particles are leaking through or around any of the filters in the filter bank.

12. The apparatus as defined in claim 11 wherein said detecting means comprises means positioned immediately downstream of each filter for selectively imparting turbulence to the portion of the airstream passing therethrough, and means for withdrawing a sample of the airstream downstream thereof to permit an analysis of the same.

* * * * *